United States Patent
Cappio et al.

(10) Patent No.: US 8,428,257 B2
(45) Date of Patent: Apr. 23, 2013

(54) DISPLAY WINDOW CONTROL SYSTEM AND METHOD

(75) Inventors: Adam Cappio, Seattle, WA (US); Ben Rothotlz, Yarrow Point, WA (US); Hai Feng Ping, Issaquah, WA (US)

(73) Assignee: Intel Corporation, Santa Clara, CA (US)

( * ) Notice: Subject to any disclaimer, the term of this patent is extended or adjusted under 35 U.S.C. 154(b) by 427 days.

(21) Appl. No.: 12/722,443

(22) Filed: Mar. 11, 2010

(65) Prior Publication Data

US 2010/0217993 A1 Aug. 26, 2010

Related U.S. Application Data

(63) Continuation-in-part of application No. PCT/US2008/010711, filed on Sep. 11, 2008.

(60) Provisional application No. 60/993,386, filed on Sep. 11, 2007, provisional application No. 61/002,106, filed on Nov. 5, 2007.

(51) Int. Cl.
*H04L 29/06* (2006.01)

(52) U.S. Cl.
USPC .......................................... 380/201; 380/200

(58) Field of Classification Search .................. 380/201, 380/200
See application file for complete search history.

(56) References Cited

U.S. PATENT DOCUMENTS

| | | | | |
|---|---|---|---|---|
| 2002/0057287 A1* | 5/2002 | Crow et al. | .................... | 345/716 |
| 2003/0080991 A1* | 5/2003 | Crow et al. | .................... | 345/716 |
| 2003/0124502 A1* | 7/2003 | Chou | ............................ | 434/350 |
| 2003/0128227 A1* | 7/2003 | Crow et al. | .................... | 345/700 |
| 2003/0128228 A1* | 7/2003 | Crow et al. | .................... | 345/716 |
| 2003/0146927 A1* | 8/2003 | Crow et al. | .................... | 345/716 |
| 2003/0229900 A1* | 12/2003 | Reisman | .......................... | 725/87 |
| 2004/0095376 A1* | 5/2004 | Graham et al. | ............... | 345/716 |
| 2004/0098671 A1* | 5/2004 | Graham et al. | ............... | 715/527 |
| 2004/0167858 A1 | 8/2004 | Erickson | | |
| 2004/0181667 A1 | 9/2004 | Venters et al. | | |

(Continued)

FOREIGN PATENT DOCUMENTS

| | | |
|---|---|---|
| JP | 13-290780 | 10/2001 |
| KR | 10-0709751 | 8/2006 |

OTHER PUBLICATIONS

PCT International Search Report for PCT International Application No. PCT/US2008/010711; May 14, 2009.

(Continued)

*Primary Examiner* — Edan Orgad
*Assistant Examiner* — Bradley Holder
(74) *Attorney, Agent, or Firm* — Stoel Rives LLP

(57) ABSTRACT

An embodiment of a method for rendering an item of media content includes obtaining a media presentation having a media-content portion and a display-window-configuration component. The display-window-configuration component is recovered from the media presentation and causes a defined display window to be presented contemporaneously with rendering the media content of the media-content portion. And an embodiment of a method for rendering an item of media content having an action-indicator associated with an action includes analyzing the media content to detect the action-indicator and executing the associated action. For example, the action-indicator may be a watermark, which may be visible while an image portion of the media content is displayed.

25 Claims, 10 Drawing Sheets

U.S. PATENT DOCUMENTS

| | | | |
|---|---|---|---|
| 2005/0226601 A1* | 10/2005 | Cohen et al. | 386/75 |
| 2007/0003224 A1* | 1/2007 | Krikorian et al. | 386/95 |
| 2007/0011614 A1* | 1/2007 | Crow et al. | 715/723 |
| 2007/0061393 A1* | 3/2007 | Moore | 709/201 |
| 2007/0061487 A1* | 3/2007 | Moore et al. | 709/246 |
| 2007/0094698 A1* | 4/2007 | Bountour et al. | 725/132 |
| 2008/0134051 A1* | 6/2008 | Chaney | 715/744 |
| 2008/0148096 A1* | 6/2008 | Zarnke et al. | 714/6 |

OTHER PUBLICATIONS

PCT Written Opinion of the International Searching Authority for PCT International Application No. PCT/US2008/010711; May 14, 2009.

\* cited by examiner

DISPLAY WINDOW CONTROL SYSTEM AND METHOD

PRIORITY CLAIM

The present application is a Continuation-in-part of PCT Application No. PCT/US2008/010711, filed Sep. 11, 2008 and U.S. Provisional Application No. 60/993,386, filed Sep. 11, 2007, and U.S. Provisional Application No. 61/002,106, filed Nov. 5, 2007, which applications are incorporated herein by reference in their entireties.

BACKGROUND

The volume of digital media content that is distributed electronically continues to increase as digital-content providers utilize the Internet as a vehicle for such distribution. Digital media content may be in the form of, for example, video, audio, text, or any combination thereof, and may be distributed as one or more files or as a data stream.

When a media player, such as RealNetworks' Real-Player®, renders a digital-media-content file or stream, the player may generate a display window that includes a user interface, and may present the media content within the display window in a specified manner.

The user interface may allow one to specify, at least in part, the manner in which the media player presents the digital media content. For example, the user interface may allow a user to condition all, or a portion of, the sound (e.g., via settings for volume, base, and treble) generated by the media player as it presents audio content. The user interface may also have settings that are not user adjustable, and may have default values for both user-adjustable and non-user-adjustable settings.

In addition, the user interface may display information that is related to the digital media content as the media player is presenting the content. For example, the user interface may display a volume bar having a length that corresponds to the volume of the sound being generated as the media player presents audio content. The settings for such information display may or may not be user adjustable.

A ubiquitous problem is the unauthorized exploitation (e.g., rendering or copying) of digital media content, often in violation of the content creator's rights (e.g., copyright) in the content.

Therefore, digital media content and media players may incorporate digital-rights-management (DRM) capabilities for preventing persons from exploiting the content in an unauthorized manner.

But even with DRM, it may be possible for the creator of an item of media content to lose control over the content as it is exploited by subsequent users. For example, suppose that a woman who has lost a significant amount of weight posts a before-and-after video on a social website that incorporates DRM for allowing only registered users of the website to view the video. It is the woman's intent that her video be viewed only by registered users of the website to inspire them to lose weight. But further suppose that one of the registered users makes and distributes an unprotected copy of the video for altruistic purposes, and that a third party subsequently edits the unprotected copy to create a new video that he uses to advertise his weight-loss product. Therefore, despite the DRM protection on the website to which the creator originally uploaded the video, the third party is able to use the video for commercial purposes without the creator's authorization and without compensating the creator for his commercial use of the video. That is, despite the DRM protection on the original website, the creator has no control over the use of the video once it leaves the website.

Therefore, even when an author or owner of an item of digital media content incorporates DRM (or another form of protection) into the item when he/she creates the item, an item of content may nonetheless be exploited in a manner not authorized by the author or owner of the content item as the content is passed to subsequent users.

Furthermore, even if an author intends to allow use of his item of content in a limited manner as it is distributed from party to party, it may be impractical, or even impossible, to track the item and to monitor and control the use of the item as the item is distributed.

For example, suppose an author desires that an item of his content is rendered with only particular advertisements that he periodically updates to keep current.

As a more specific example, suppose that a film studio may make one of its children's films available for free download as long as the film is rendered only with children-friendly advertisements, and may incorporate DRM into the film file to assure compliance. But suppose that one who downloads the film defeats the DRM to gain access to the film without the studio-provided advertisements, repackages the film with advertisements that are not children friendly, and provides the repackaged film to others for viewing. The studio of the film may never know of this unauthorized use, and, therefore, may be unable to prevent this unauthorized use of its film.

In another example, suppose that a film studio makes one of its children's films available for free download such that the film file includes only trailers for recently released films from the studio. Even if a third party downloads and distributes the film in its original form, at some point the trailers in the distributed version will be out of date, and the studio may have no way of halting the distribution of this version with the out-of-date trailers.

SUMMARY

An embodiment of a method for rendering an item of media content includes obtaining a media presentation having a media-content portion and a display-window-configuration component, which is recovered from the media presentation and causes a defined display window to be presented contemporaneously with the rendered media content from the media-content portion.

In an embodiment, the display-window-configuration component initiates reporting of data, such as user data and data indicating use of the media content, to a remote location.

In an embodiment, the display-window-configuration component may initiate a query to a remote device for a modification or update to the display window.

An embodiment of a method for rendering an item of media content in a frame with an action-indicator associated with an instruction includes analyzing the frame to detect the action-indicator and executing the associated instruction. For example, the action-indicator may be a watermark, which may be visible while an image portion of the media content is displayed.

In an embodiment, an instruction associated with a watermark may initiate reporting of data, such as user data and media-content-use data, to a remote location.

In an embodiment, an instruction associated with a watermark may initiate a query to a remote device for modifications or updates to a display window.

DETAILED DESCRIPTION

Figure 1:
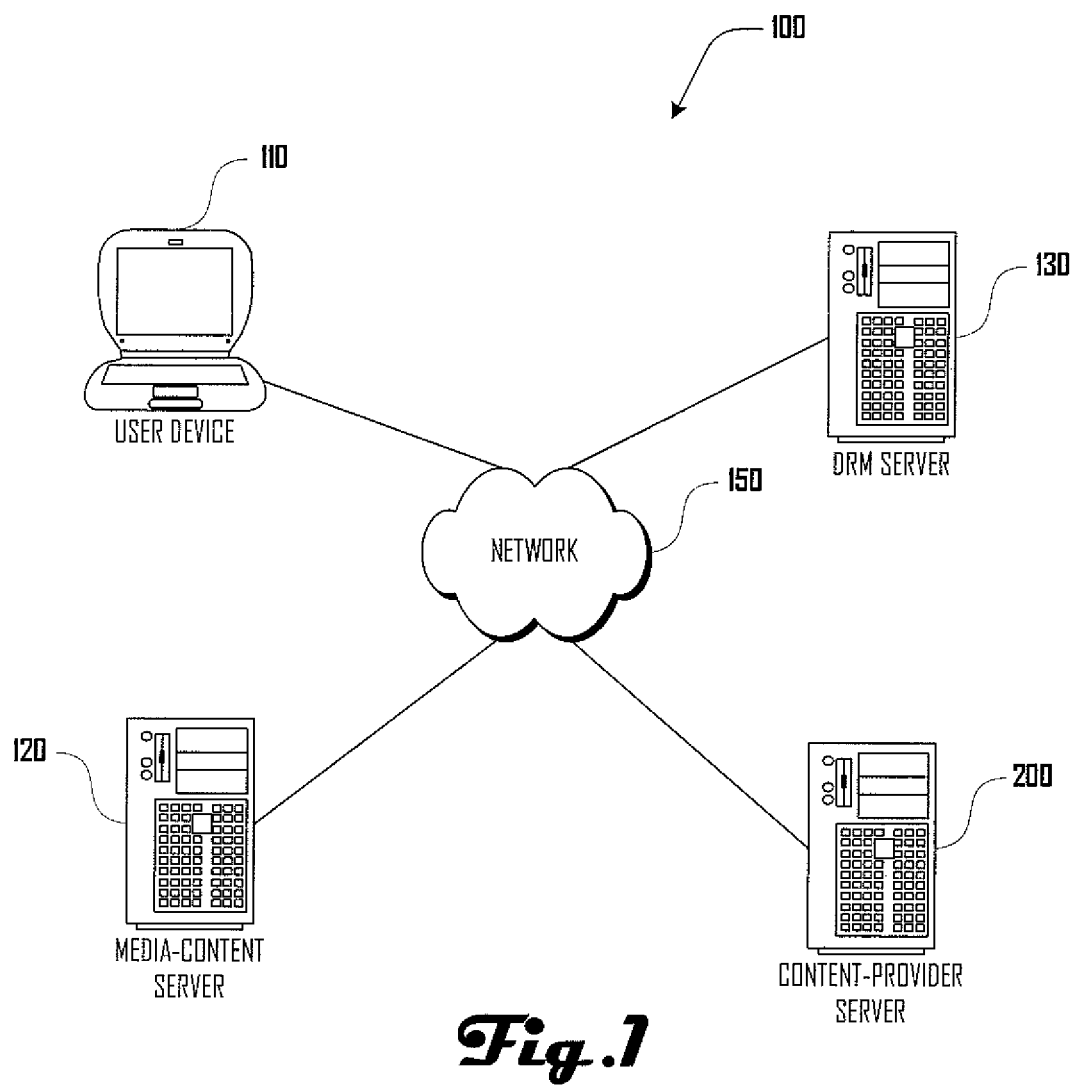
FIG. 1 is a diagram of an embodiment of a network that includes a user device, DRM server, media-content server, and content-provider server.

FIG. 1 is a diagram of an embodiment of a networked system 100, which includes a user device 110, digital-rights-management (DRM) server 130, media-content server 120, and content-provider server 200. The user device 110 and servers 120, 130, and 200 are operably interconnected via a network 150, which may include, for example, the Internet, a local area network, a wireless network, or a satellite network.

The user device 110 may be a computing device such as, e.g., a desktop computer, server, laptop computer, cellular telephone, gaming system, personal data assistant, or media player device. And any one, or any combination, of the media-content server 120, DRM server 130, and content-provider server 200 may perform some or all of the functions, methods, and communications discussed herein.

In an embodiment, the user device 110 may obtain a media presentation 340 (FIG. 3) that has been created by and/or is otherwise accessible from the content-provider server 200, and the user device 110 may then communicate with the content-provider server 200 as discussed further herein. As discussed below in conjunction with FIG. 3, the media presentation 340 may be a file that includes media content 310 and a display-window-configuration component 320, which may be cryptographically bound to form the media presentation 340. In another embodiment, the user device 110 may obtain the media presentation 340 from a media-content server 120, and may communicate with a DRM server 130 and/or content-provider server 200 as discussed herein.

For example, in an embodiment, a movie studio may produce movies as a content provider. The movie studio and/or third parties, such as distributors, may desire to control how digital versions of the movies are viewed by users regardless of where the users obtain the digital copy. Accordingly, the movie studio, distributor, or other third party may generate a media presentation 340 that includes the movie (e.g., the media content 310), and which is also operable to control how the movie is viewed by a user (e.g., via a display-window-control component 320).

The media presentation 340 that includes the movie may be distributed by the movie studio, but may also be sent to an outside digital movie distributor that may distribute digital movies from various studios and independent producers. For example, a distributor may rent or sell digital movie content to users. Such a distributor may utilize a media-content server 120 for such distribution.

Users may obtain the media presentation 340 from the various sources, including, e.g. a digital movie distributor, but regardless, the media presentation 340 controls how the digital movie is displayed when a user plays it on a user device 110, and such control may even include the ability to update a display window, user interface or even control how and if the movie may be viewed. Accordingly, as discussed in further detail below, the movie studio or other party who prepared the media presentation 340 may retain control over how the movie is viewed by users regardless of where the media presentation 340 is obtained or how many times it has been transferred from user to user.

Figure 2:
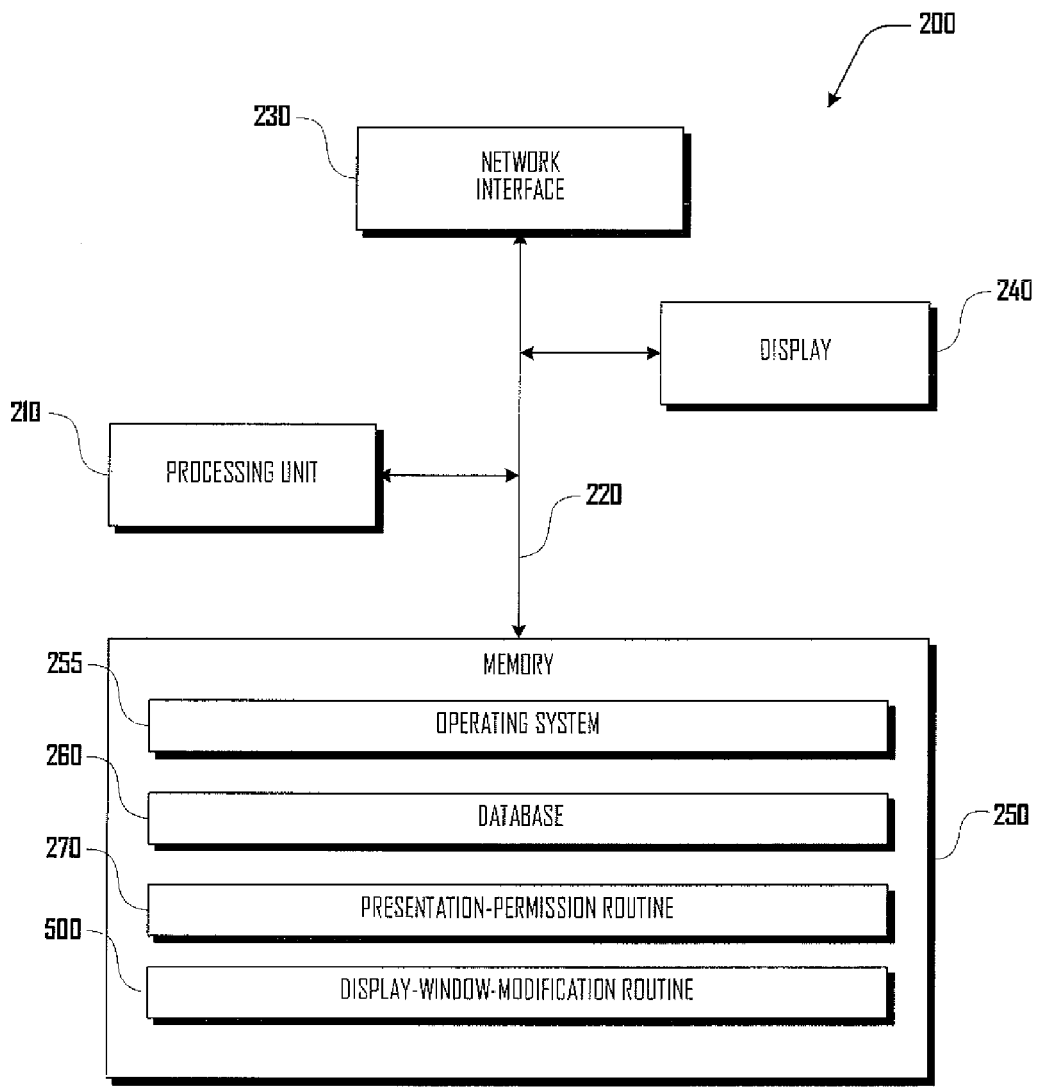
FIG. 2 is a block diagram of an operating environment for an embodiment of the user device of FIG. 1.

FIG. 2 is a block diagram of an embodiment of an operating environment of one or more of the media-content server 120, the DRM server 130, and the content-server provider 200 of FIG. 1. For purposes of explanation, however, the operating environment is discussed in conjunction with an embodiment of the content-provider server 200. Furthermore, the content-provider server 200 may include fewer or more components than those shown in FIG. 2.

The operating environment for the content-provider server 200 includes a network interface 230 for connecting to remote devices (not shown).

The network interface 230 may be designed to support, e.g., a local area network ("LAN"), wireless local area network ("WLAN"), personal area network ("PAN"), Worldwide Interoperability for Microwave Access ("WiMax"), telephone network, pager network, powerline connection, serial bus, or universal serial bus ("USB") wireless connection. And the network interface 230 includes circuitry (e.g., a transceiver) and software (e.g., a driver) to support such a connection, and is constructed for use with the appropriate protocols for such a connection.

The operating environment of the content-provider server 200 also includes a processing unit 210, an optional display 240, and a memory 250, all interconnected to each other and to the network interface 230 via a bus 220. The memory 250 may be or may include random-access memory ("RAM"), read-only memory ("ROM"), and a permanent mass-storage device, such as a disk drive or flash RAM. The memory 250 may store the program code for a display-window-modification routine 500 (FIG. 5), and a media-presentation-permission routine 270. In addition, the memory 250 may store an operating system 255 and a database 260.

In an embodiment, a media-presentation-permission routine 270 may include various digital rights management (DRM) functions. Additionally, such DRM functions may include communication with a DRM server 130, or the like.

It will be appreciated that one or more of the program-code components may be loaded from a computer-readable medium into memory 250 using a drive mechanism (not shown) or network mechanism (not shown) associated with the computer-readable medium. Examples of suitable computer-readable media include a floppy or hard disk, tape, digital versatile disc (DVD), compact disc (CD), flash RAM, and network-interface card.

Referring to FIGS. 1-2, in an embodiment, a user device 110, media content server 120, DRM server 130, or similar device may configure or interact with the content-provider server 200 using a graphical user interface (GUI). An example of a GUI is an interactive web page, which may be in one or more of the following formats: HyperText Markup Language (HTML), Flash, JavaScript, VBScript, JScript, ASP.NET, PHP (HTML Preprocessor), or eXtensible HTML (XHTML).

Figure 3:
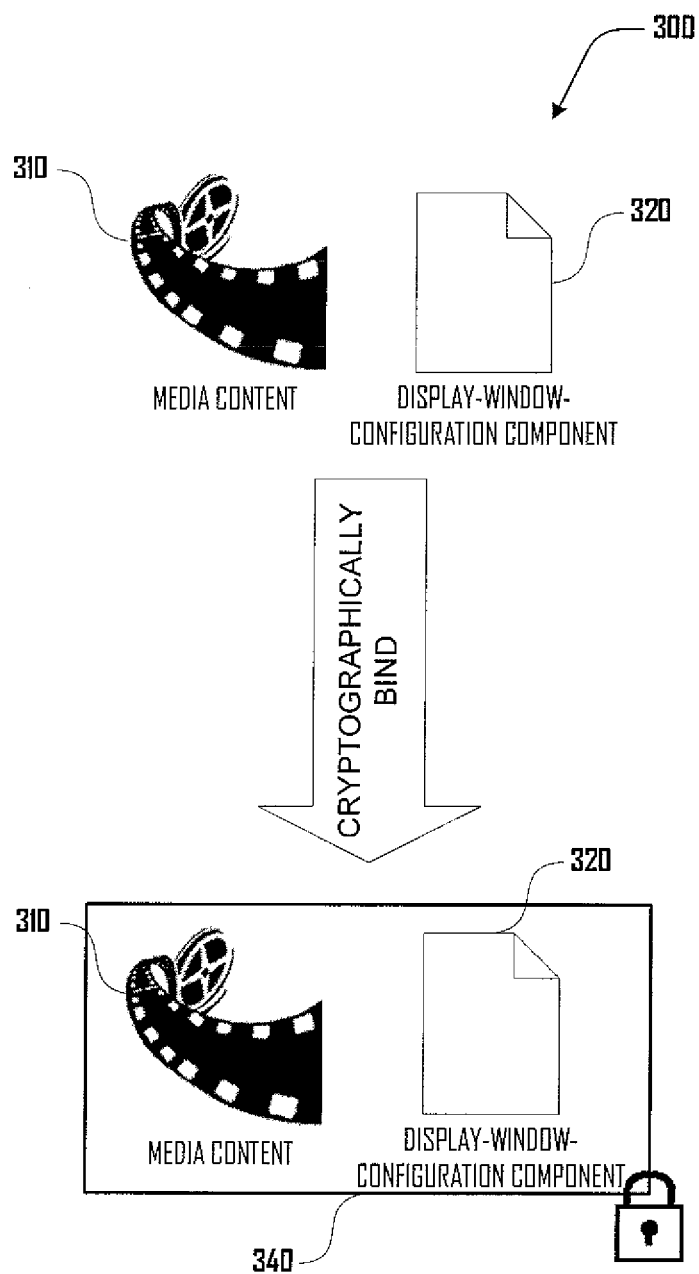
FIG. 3 is a diagram of an embodiment of a process for generating a media presentation that includes media content and a display-window-configuration component.

FIG. 3 is a diagram of a process 300 for generating the media presentation 340, which includes the media content 310 and the display-window-configuration component 320. As discussed above and further below, the media content 310 and the display-window-configuration component 320 may be combined into one or more files that are cryptographically bound to generate the media presentation 340. In an embodiment, the display-window-configuration component 320 may comprise a user interface (or instruction for the same) or a URL pointer.

The media content 310 may include one or more types of digital media such as audio media and visual media such as text, image, slide, spreadsheet, and video media. And the media content 310 may be in one or more formats such as RealMedia®, RealAudio®, MPEG, WAV, WMA, MP3, MOV, DV, SWF, WMV, BMP, GIF, JPEG, PDF, DOC, and FLV.

In an embodiment, the display-window-configuration component 320 includes program code that alters at least a portion of a media-content display window (FIG. 4) of a media player, or a user interface associated with the media player. The display-window-configuration component 320 may be configured to alter a default appearance or configuration of a media player, display window 400, or user interface that is resident on a user device 110 (FIG. 1), or may configure a media player, display window 400 or user interface that is bundled with the media presentation 340. Additionally, as discussed herein below, the media player may be modified by content obtained from a remote server. For example, RealPlayer® may have a default appearance and configuration, which may be altered by the display-window-configuration component 320 of a media presentation 340, and/or the display-window-configuration component 320 may initiate obtaining updated appearance or configuration information from a remote server. This may allow the author of the media presentation 340 to control how the media player and associated user interface looks and operates while the media content 310 is being rendered by the media player, and may also allow further changes to the configuration over time. Some embodiments provide for changes to the media presentation 340, display-window-configuration component 320, or media content 310 over time.

In another embodiment, the display-window-configuration component 320 may represent a customized version of a media player that is bundled with the media presentation 340 to render media content 310 of the media presentation. Additionally, as discussed herein below, such a customized media player may be further modified by content obtained from a remote server. For example, a customized version of RealPlayer® may be bundled with a media presentation 340, which includes a custom-default appearance and functionalities that have been chosen by the author of media content 310 in the media presentation. Additionally, if the author of the media content 310 desires to further modify the custom-default appearance or functions of the bundled RealPlayer®, such further configurations may be obtained from a remote server.

The combination of the media content 310 and the display-window-configuration component 320 into the cryptographically bound media presentation 340 may be performed by a conventional encryption application that employs a conventional encryption technique.

For example, the media presentation 340 may be generated, encrypted, and packaged for distribution over the network 150 (FIG. 1) by RealNetworks' Remora application program, GnuPG/PGP, OpenSSL, Tor, Stunnel, OpenVPN, or TrueCrypt. Additionally, the media content 310 and/or the display-window-configuration component 320 may also be individually encrypted before they are combined and encrypted to form the media presentation 340. In some embodiments, however, the media presentation 340 may be unencrypted.

In another embodiment, cryptographic binding may be achieved via a cryptographic hash. For example, the media presentation 340 may be hashed by the user device 110 and the hash result compared to a previous hash, also referred to herein as a reference hash, of a control-version of the media presentation 340, and presentation of portions of the media presentation 340, or unpacking of the media presentation 340 may be prevented if the compared hashes do not match. In further embodiments, the media presentation 340 may be cryptographically bound via various other suitable techniques. The reference hash may be included in, obtained in conjunction with (from a remote data source), or otherwise associated with the media presentation 340.

Furthermore, the media presentation 340 and/or media content 310 may be formatted for rendering by conventional media-content players or media-presentation applications such as RealNetworks' Nimbus web media player, RealPlayer®, Adobe Flash® Player, Windows Media Player, Adobe Shockwave®, iTunes®, and QuickTime®. The media presentation 340 may be formatted before or after it is cryptographically bound. Or, the media content 310 and the display-window-configuration component 320 may each be separately formatted before being combined to generate the media presentation 340. Also, the display-window-configuration component 320 may be formatted to be compatible with one or more types of conventional media-content player.

In various embodiments, a media presentation 340 having media content 310 and a display-window-configuration component 320 may be desirable in a peer-to-peer distribution setting. For example, because the media presentation 340 may include all elements necessary for customization of a media player and presenting media content 310 via the media player, any peer within a peer-to-peer network may distribute or consume the media presentation 340.

Figure 4:
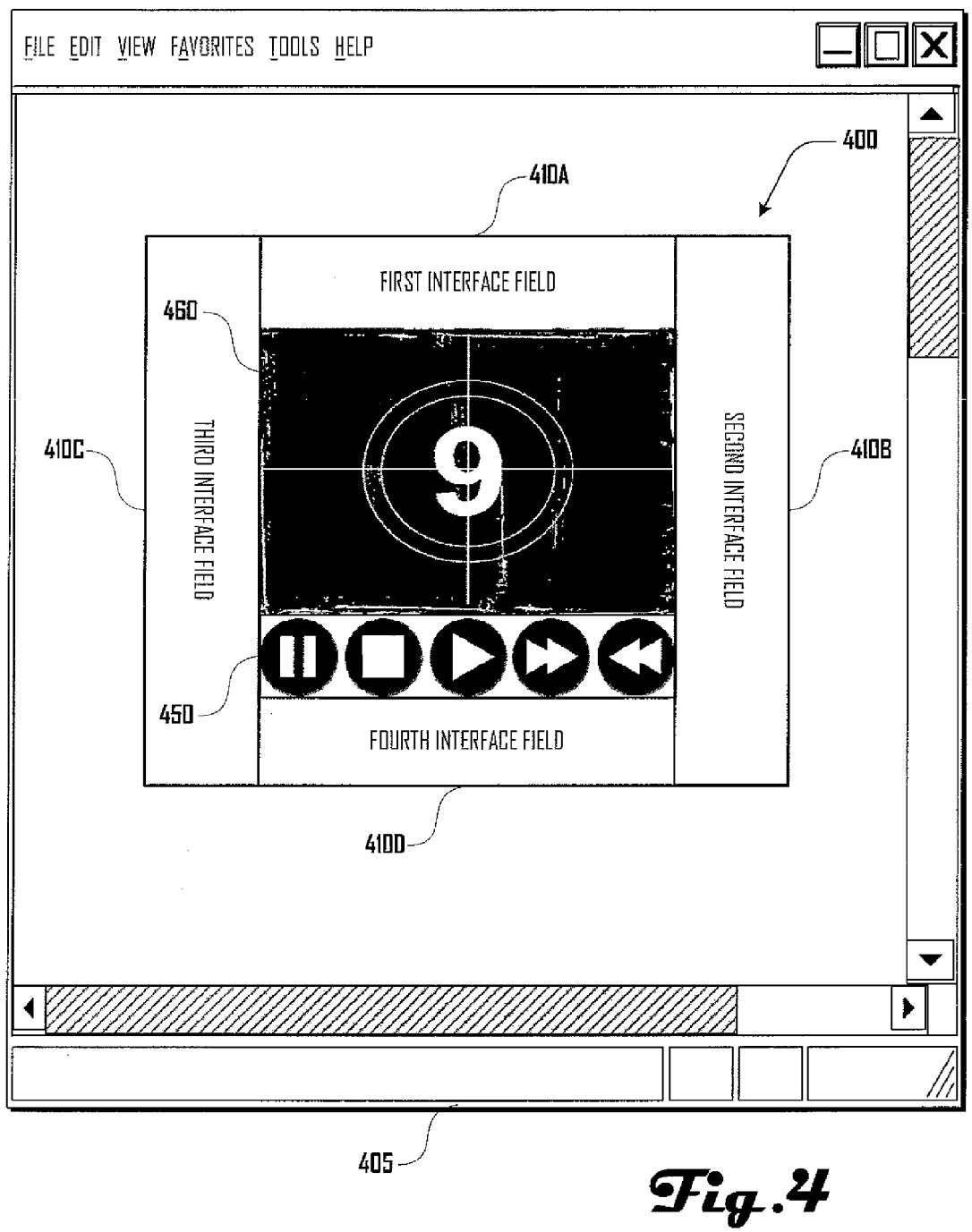
FIG. 4 is a diagram of an embodiment of a display-window that comprises a plurality of configurable interface fields.

FIG. 4 is a diagram of an embodiment of a display-window 400, which may be generated by a media player, and which may include one or more configurable user-interface fields 410, a media-content-rendering field 460, and a media-content-rendering-control-field 450. It is contemplated, however, that the layout and makeup of the display-window 400 may be altered in any suitable manner, and that the display window may include one or more conventional elements such as flash program elements, Cascading Style Sheet (CSS) program elements, Java program elements, and Microsoft Silverlight® program elements.

As discussed herein, a software application (e.g., a media player) for generating the display-window 400 may already be present on a user device 110 and be modified in accordance with instructions present in the display-window-configuration component 320 of the media presentation 340 (FIG. 3). However, in some embodiments, application software for generating the display-window 400 may be included in or linked-to by the media presentation 340 and/or may be part of or linked-to by the display-window-configuration component 320.

The media-content-rendering field 460 may display or render the media content 310 (FIG. 3) such as a movie or other video, a still image, audio, text, or a document. Rendering of such media content 310 may be controlled by the mediacontent-rendering-control-field 450. In addition to rendering the media content 310, the media-content-rendering field 460 may render visual media that is resident on the user device (FIG. 1) or that is obtained from a remote server.

The media-content-rendering-control-field 450 may control the rendering of the media content 310 in the media-content-rendering field 460, with or without user input. For example, the media-content-rendering-control-field 450 may include buttons such as play, stop, pause, forward, and rewind as depicted in FIG. 4, and may also include other buttons or interface fields that may control aspects of the rendering such as sound equalization, video speed, image quality, image size, and image resolution.

Additionally, the media-content-rendering-control-field 450 may be modified by the display-window-configuration component 320 as discussed in more detail below. For example, the buttons of the media-content-rendering-control-field 450 may be modified to include the faces of characters from a movie that is being rendered in the media-content-rendering field 460.

The interface fields 410 may display various types of media content, which may be default content, content as provided by a display-window-configuration component 320, content that is linked-to (including through the use of dynamic links), and/or media content otherwise obtained from a remote server. For example, one or more of the interface fields 410 (shown as examples, not required embodiments) may be configured to display, e.g., advertisements, artwork, or text that is related to the media being presented in the media-content-rendering field 460.

In an embodiment, one or more of the interface fields 410 may be configured to present an advertisement that relates to the media content 310 playing in the media-content-rendering field 460, or an advertisement that the author of the media content 310 or the media presentation 340 wants a user to see. Alternatively, advertisements may be delivered based on characteristics of the user viewing the media content 310, based on the user's use of the media content 310, or based on a web domain and/or Internet address from which the media-presentation application is streaming the media content 310.

Accordingly, the display-window-configuration component 320 may customize one or more of the interface fields 410 or one or more of the other elements of the display-window 400 for the media content 310.

For example, an author of the media content 310 may thereby configure the display-window-configuration component 320 to effectively control the advertisements that a user views in the interface fields 410 while the user is viewing the media content 310.

In a more specific example, a movie studio may generate a free media presentation 340 that includes a low-resolution version of a movie for which there is a higher-resolution version available, for example, for sale on DVD or as a download. The movie studio may desire to inform viewers of the low-resolution version that they may purchase the higher-resolution version while the viewers are watching the low-resolution version. Accordingly, the display-window-configuration component 320 of the media presentation 340 may configure the display-window 400 to display banner advertisements for the higher-resolution DVD in one or more of the interface fields 410. In addition to the display-window 400 displaying passive advertising images, the viewer may be prompted to click on an interface field 410 to be directed to the website of a seller of the DVD or the website of the movie studio.

In another example, the display-window-configuration component 320 may configure the display window 400 to display within one or more of the interface fields 410 artwork or other images that enhance or augment the media content 310 currently being displayed within the media-content-rendering field 460.

In a more specific example, a photographer may create the media content 310 as a slide show with forty photographs, and encode this media content in a media presentation 340 along with a display-window-control component 320 that is configured to make the interface fields 410 of the display-window 400 black during the first twenty slides, and then make the interface fields 410 white during the following twenty slides—the artist may believe that these all-black and all-white borders may create ideal frames for his respective photographs.

In an embodiment, a media player (e.g. RealPlayer® or Windows Media Player®) and/or browser including media player functions may be modified to be responsive to a display-window-control component 320. For example, a media player component, ad-on or plug-in may be used to give a media player and/or browser the capability of being responsive to a display-window-control component 320.

Still referring to FIG. 4, although the four interface fields 410 are discussed as displaying content specified by the display-window-configuration component 320, one or more other portions of the display-window 400 may display such content or may be selectively modified or configured by the display-window-configuration component. For example, the configuration component 320 may cause the media player to implement media player skins, context/right-click menus, popup media, URL links, or the like in any one or more of the rendering field 460 and rendering-control field 450. Also, as discussed above, the configuration component 320 may otherwise configure or modify the media-content-rendering field 460 or the media-content-rendering-control-field 450.

Furthermore, the display-window-configuration component 320 may also be configured to change the layout of the display-window 400. For example, the display-window-configuration component 320 may include instructions to remove various interface fields 410, move various interface fields 410, change the size of various interface fields 410, or add additional interface fields 410, or to perform similar operations on the media-content-rendering-control-field 450.

Additionally, in an embodiment, the display-window-configuration component 320 may cause the media player to present advertising content within the display field 460 before playing the media content 310, during media content playback, or after media content playback. For example, instead of simply causing the media player to provide banner advertisements in one or more of the interface fields 410, the display-window-configuration component 320 may cause one or more advertisements to be interspersed throughout the media content 310 similar to commercials during a television show. Or, the configuration component 320 may cause the media player to present a "pre-roll" advertisement before the media content 310 is presented, or a "post-roll" advertisement after or during the presentation of the media content 310. Such advertisements may be included as part of the media presentation 340 or may be updated via communication with a remote server as discussed below.

Figure 5:
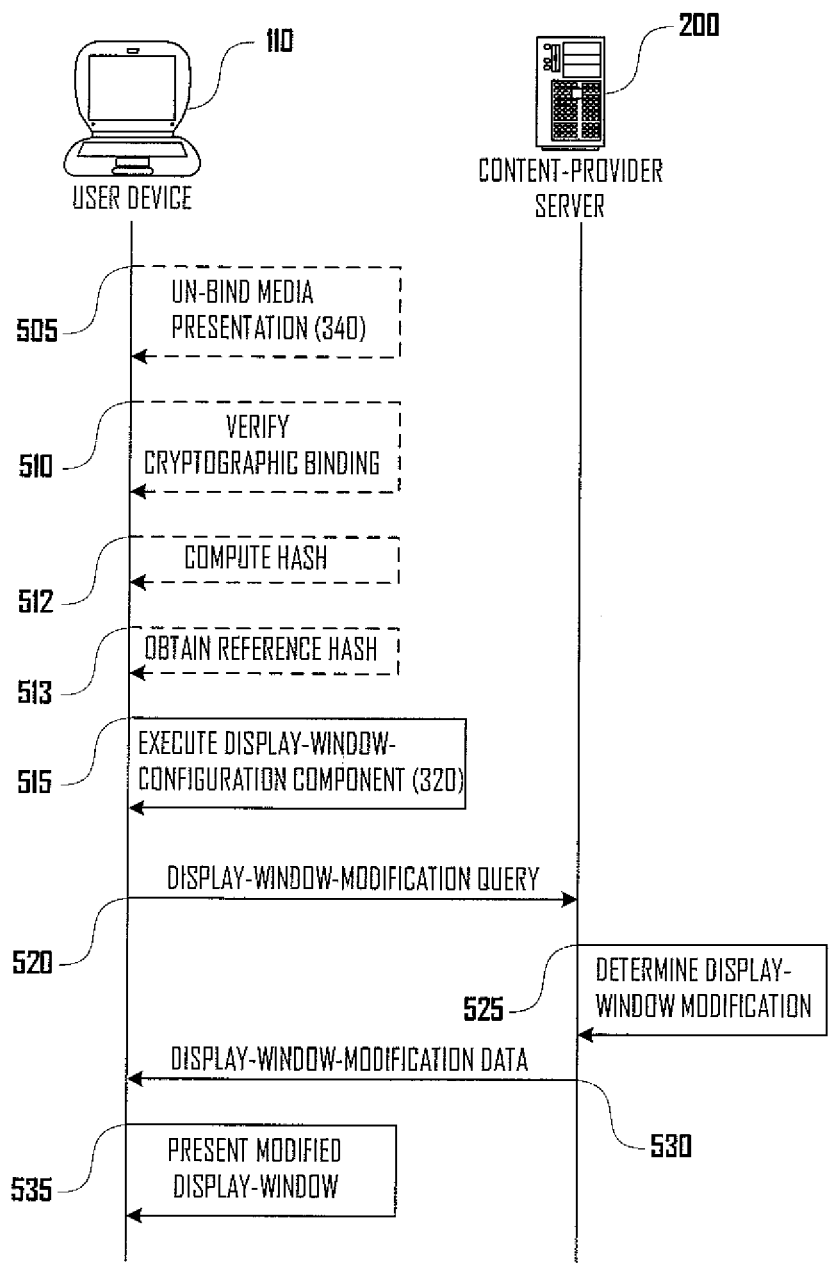
FIG. 5 is a data-flow diagram of an embodiment of a method for modifying a display window.

FIG. 5 is a data flow diagram of an embodiment of communications between a user device 110 and a content provider server 200 that occur during an embodiment of media-player-display-window modification. For example, a user downloads a movie presentation file (a media presentation 340) and opens it for playing via a display-window 400 on the user's computer (user device 110).

Opening the movie presentation file (media presentation 340) activates the display-window-configuration component 320 and a media player resident on the user device 110, and the configuration component causes the media player or another application on the user device 110 to request from the movie studio's website (or other distributor's website) updates to the media player's display window 400 (e.g. interface fields 410) or to the media player's presentation format (e.g., is the movie to be viewed with or without commercials). Therefore, these updates or advertisements are obtained from the movie studio, which may, therefore, control the context of how a user views the movie.

For example, if a user is viewing a science fiction movie, the movie studio may desire to advertise its new science fiction movies that are coming out by presenting advertisements for such movies within the display-window 400 in which the movie is being presented. Because movie studios continually create new movies, the movie studio may utilize the display-window-configuration component 320 to update the advertising content as desired by the movie studio.

Accordingly, in an embodiment, the display-window-configuration component 320 may change, or cause the media player to change, the interface field 410 associated with a display-window 400 of FIG. 4. The interface fields 410 associated with the display-window 400 may be changed to display media that augments the media content 310 being played. Alternatively, advertisements may be presented which relate to the media content 310 or which are selected for the user viewing the media content 310. In some embodiments, where Internet or network connectivity is not available, a default advertisement may be presented.

Still referring to FIG. 5, at optional step 505 a user device 110 un-binds the media presentation 340 (FIG. 4) if it is cryptographically bound. Un-binding the media presentation 340 may comprise decrypting all or part of the media presentation 340. The decryption key may be part of the user device 110 and/or may be obtained from a third party, such as the DRM server 130. At optional step 510 the cryptographic binding is verified. Verification of the cryptographic binding may include decrypting all or part of the media presentation 340 and/or may include computing a hash, step 512, of all or part of the media presentation 340, which hash may be compared to an obtained reference hash of all or part of the media presentation 340, obtained in step 513. The reference hash may be provided as part of the media presentation 340 and/or the reference hash may otherwise be associated with the media presentation 340, and/or the reference hash may be obtained from a party such as the media-content server 120, the content-provider server 200, and/or the DRM server 130. At 515 the user device 110 recovers the display-window-configuration component 320 from the media presentation 340 and executes the display-window-configuration component. For example, in an embodiment, the display-window-configuration component 320 may be configured to auto-run or auto-initiate itself after being recovered from the media presentation 340.

At 520, in response to the configuration component 320, the user device 110 sends a display-window-modification query to the content-provider server 200, and at 525, the content-provider server determines whether there is a corresponding display-window modification. If there is a corresponding display-window modification, then display-window-modification data is sent to the user device 110 at 530, and the user device 110 causes the media player to present the modified display window at 535.

In a similar manner as just described, any component of the display-window 400 (FIG. 4), the media content 310, or the display-window-configuration component 320 itself may be permanently, semi-permanently, or temporarily modified by the content provider server 200, a DRM server 130, the user device 110, or the like.

For example, the content-provider server 200 (FIG. 1) may determine that an interface field 410 (FIG. 4) is to be modified to augment media content 310 being rendered, and, therefore, may send visual media to be displayed in the interface field 410 while the media player is presenting the media content 310 within the display-window 400.

In another example, the display-window-configuration component 320, or the content-server provider 200 in response to the display-window-configuration component 320, may direct that the display window 400 be modified using media already present on the user device 110. Such media may be part of an obtained media presentation 340 or may be otherwise resident on the user device 110.

Figure 6:
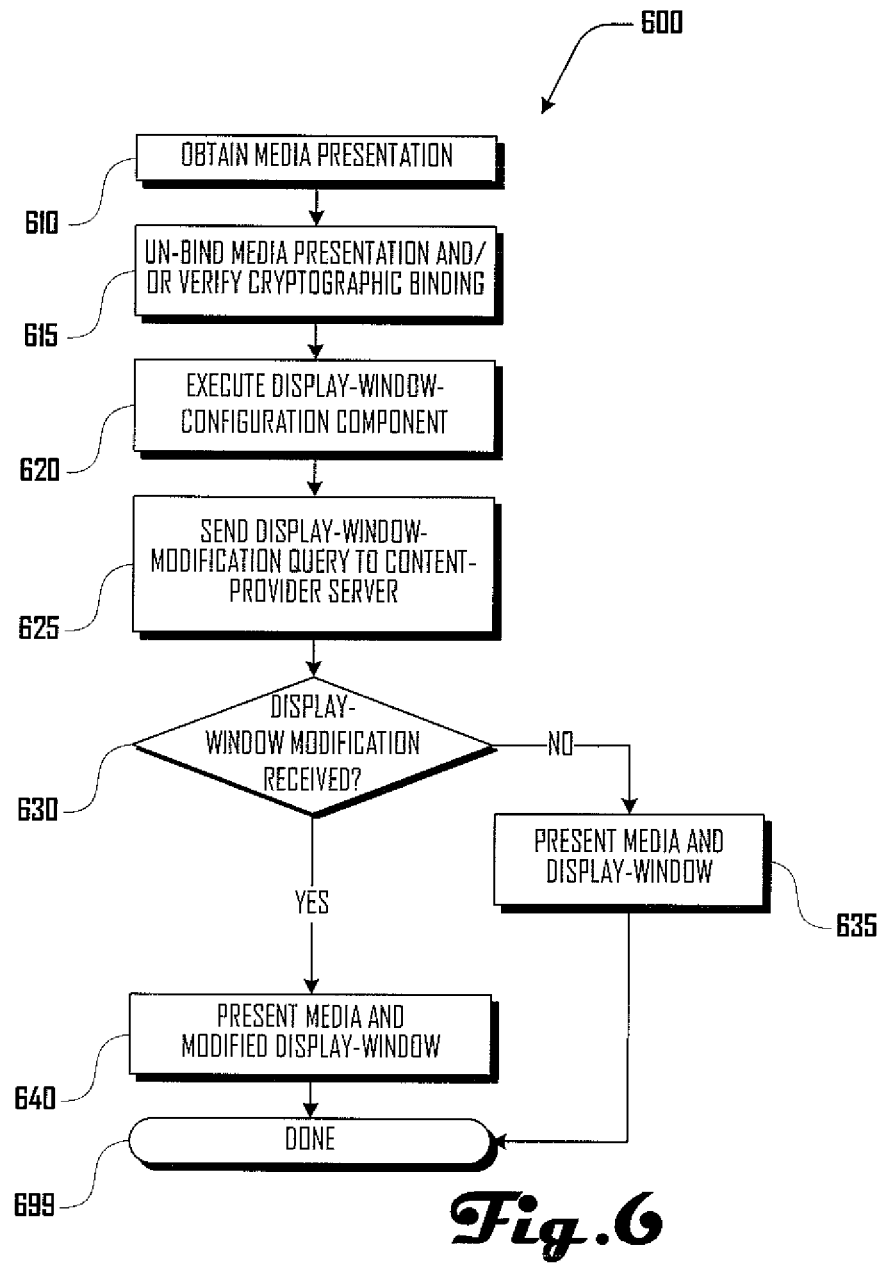
FIG. 6 is a flow chart of an embodiment of a method for modifying a display window.

FIG. 6 is a block diagram of an embodiment of a display-window-modification method 600.

The method 600 begins in block 610, where a media presentation 340 is obtained, and in block 615 the media presentation 340 is un-bound and/or the cryptographic binding is verified (if the media presentation was previously cryptographically bound).

In block 620, the user device 110 recovers and executes the display-window-configuration component 320, and in block 625, a display-window-modification query is sent to the content-provider server 200.

In block 630, the user device 110 determines whether a display-window modification corresponding to the query has been received from the content-provider server 200. As discussed herein, a display-window modification may include instructions to modify a display-window 400, media with which to modify an interface field 410 associated with a display-window 400, or a pointer to a location of such media or instructions.

If the user device 110 has not received a display-window modification, then the method 600 continues to block 635, where media content 310 is displayed within a default display window 400 of the media player, and the interface-modification method 600 ends at block 699 after the media player finishes presenting the media content 310.

However, if the user device 110 does receive a display-window-modification from the content-provider server 200, then in block 640, the media player modifies its display window 400 accordingly, and presents the media content 310 within the modified display window 400. After the media player finishes presenting the media content 310, the user device proceeds to end block 699. If the media content 310 is non visual (e.g., audio), then the media player may still present the media content while displaying the modified display window 400 (e.g., modified to show a volume bar whose length is proportional to the volume of the presented audio).

Figure 7:
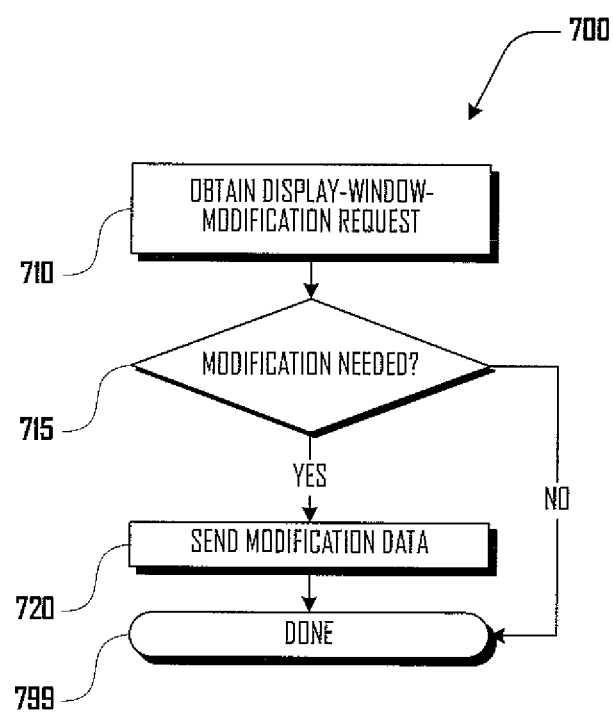
FIG. 7 is a flow chart of another embodiment of a method for modifying a display window.

FIG. 7 is a block diagram of an embodiment of a display-window modification method 700 that may be performed by the content-provider server 200 of FIG. 1 (or another server) in response to a display-window modification query from or instigated by the display-window-modification component 320 of FIG. 4.

In block 710, the content-provider server 200 receives the query.

In block 715, the content-provider server 200 determines whether there exists a display-window modification corresponding to the query. For example, if targeted advertisements or up-to-date advertisements are available for the media content 310 with which the querying display-window-modification component 320 is associated, then the content-provider server 200 may determine that a modification to the display window 400 is warranted.

If the content-server provider 200 determines that a modification to the display window 400 does not exist, then the content-server provider notifies the user device 110 that no updates are available, and finishes the method 700 at block 799.

But if the content-server provider 200 determines that a modification to the display window 400 exists, then in block 720 it sends the modification data or instructions to the user device 110. After sending the modification data or instructions, the method 700 proceeds to ending block 799.

Referring again to FIGS. 1 and 4, in an embodiment, the display window 400 may initiate reporting of user data and media use data to a remote location such as, for example, the content-provider server 200 and/or another server. For example, the user device 110 may send user data to the content-provider server 200, and may also send media-use data to the content-provider server 200, which may save this user and media-use data. In other embodiments, the user device 110 may report this data to the DRM server 130 or the media-content server 120 or to another server (not shown).

User data may include, e.g., a user and/or device identification, a password, a membership status, a geographic location, a user age, a user IP address, user device 110 information, a user name, a user address, user preferences, user advertising data, a user/device key or certificate, or a user e-mail address.

Media-use data may include identification of a media player or display window 400 that is rendering the media content 310 from the media presentation 340, a screen size at which the media content is being rendered, the user device 110 on which the media content 310 is being rendered, a type of use (e.g., commercial or personal), the number of times that a given user or user device 110 has rendered the media content, the origin of media presentation 340, whether the media presentation 340 has been copied and/or stored locally, or whether the media content 310 is being streamed from a certain website.

In response to the user data or media-use data that the user device 110 sends, the content-provider server 200 may determine whether the rendering of the media content 310 by the user device 110 is authorized. Where presentation of media content 310 by the user device 110 is not authorized, the content-provider server 200 may prohibit rendering of the media content 310 on the user device 110 in a conventional manner.

For example, as discussed above, in addition to the media presentation 340 as a whole being cryptographically bound, the media content 310 may be individually cryptographically bound as well. A decryption key may be required decrypt the media content 310 before the media content can be rendered. This decryption key may be available from the content provider server 200, the DRM server 130, or similar, but obtaining the decryption key may be contingent upon data reporting or other contact with the media-content server 120, or may be contingent upon authorization by the content-provider server 200 based on reported data. Accordingly, the content-provider server 200 may send a media-content-presentation denial to the user device 110, such that a media player running on the user device 110 is unable to present the media content 310 or a decryption key may be provided in a media-content-presentation authorization response.

Regulation of the presentation of the media content 310 by a user device 110 may be accomplished in various ways. For example, the display-window-configuration component 320 may cause the user device 110 to communicate with the DRM server 130 or with the content-provider server 200 to, e.g., obtain a license, confirm user data, submit a pass-code, or pay a license fee to/from the DRM server 130 or content-provider server 200.

Figure 8:
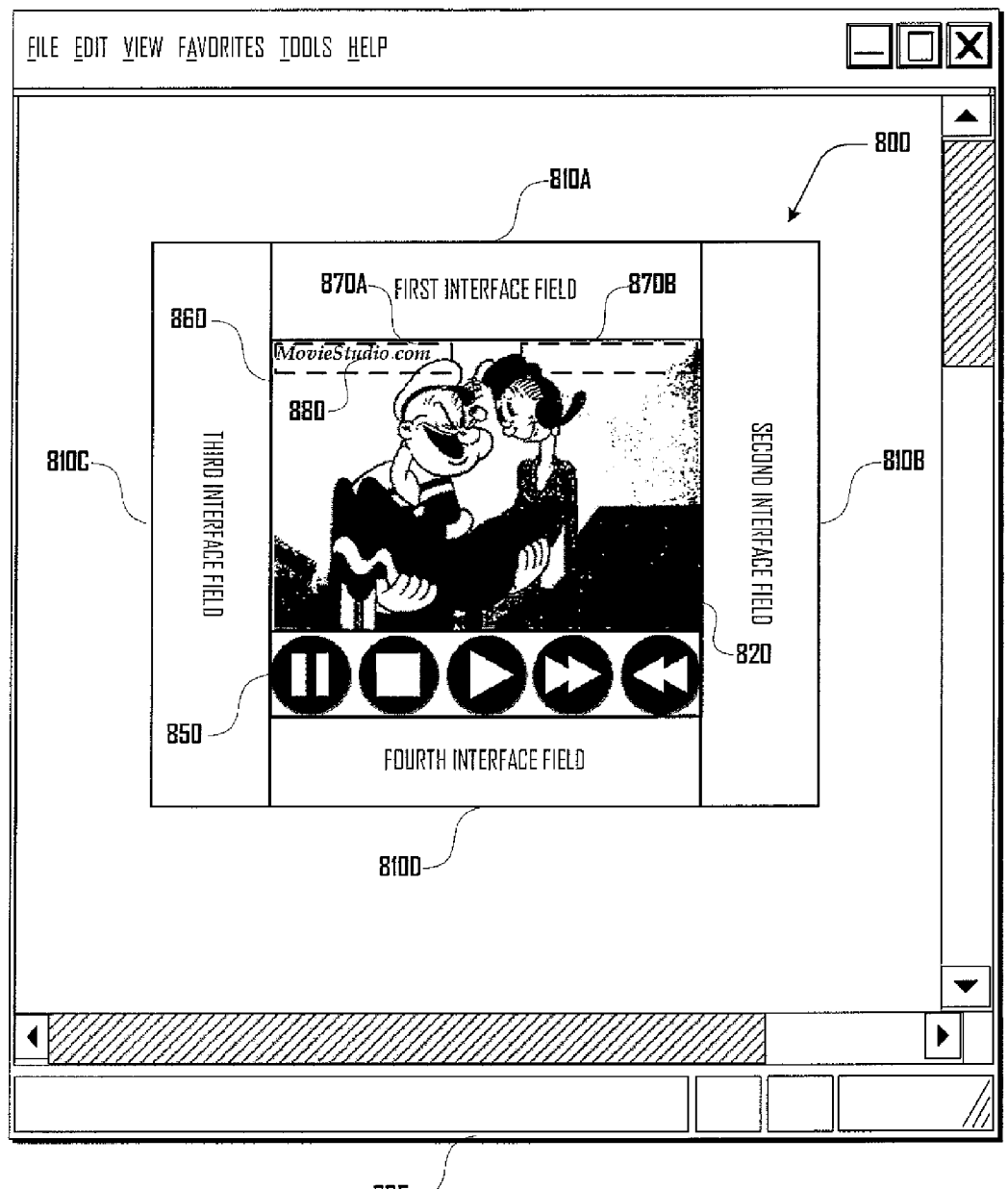
FIG. 8 is a diagram of an embodiment of a display window that includes a plurality of interface fields and that renders an image frame that includes a watermark.

FIG. 8 is a diagram of a display-window 800 generated by another embodiment of a media-presentation application or media player. The display-window 800 includes one or more configurable interface fields 810, a media-content-rendering field 860, and a media-content-rendering-control field 850. It is contemplated, however, that the layout and makeup of the display-window 800 may be altered in any suitable manner as discussed herein.

In contrast to an embodiment of the display-window 400 discussed above in relation to FIGS. 4-7, an embodiment of the display window 800 as discussed below in relation to FIGS. 9-10 may be modified or customized without obtaining instructions from a media presentation 340 or display-window-configuration component 320 (FIG. 3). Instead, the display window 800 may be modified or customized based on instructions recovered directly from an item of media content 820 or from a remote server that the display-window-configuration component 320 points to or is associated with. Therefore, instead of packaging a display-window-configuration component 320 with the media content 820, the creator of the media content may include configuration instructions, pointers, or a watermark associated with configuration instructions within the media content itself.

For example, in an embodiment, a media player may be operable to scan the frames of a movie being rendered for a watermark 880. In another embodiment, a media player (e.g. RealPlayer® or Windows Media Player®) and/or browser may be modified to detect and be responsive to a watermark 880. For example, a media player component or ad-on may be used to give a media player the capability of scanning for, detecting, and being responsive to a watermark 880.

If the media player identifies a watermark 880, then the media player may read the watermark 880 and change one of more of the interface fields 810 based on instructions recovered from the watermark 880 itself or from a remote server (e.g. the content-provider server 200 of FIG. 1) that the watermark 880 (e.g., a URL) points to. For example, the media player that generates the display-window 800 and presents the media content 820, and may obtain advertisements or images from a source designated by the watermark 880, or may configure the display-window 800 in accordance with instructions recovered from the watermark 880.

Accordingly, in an embodiment, the display-window 800 may present media content 820, and a search may be performed for a watermark 880 that is present in the media content 820 (the search may occur before or during the presentation of the media content 820). As used herein, a watermark 880 may be various sizes, opacities, colors, and the like, and may include various alphanumeric characters, a barcode, or other code. Accordingly, any suitable code or symbol may be used in various embodiments. In some embodiments, a watermark may not be capable of perception by a viewer (e.g., invisible or in an un-displayed portion of a frame), or may not be included on every video frame or may be spread, largely imperceptibly, across more than one frame and/or more than one location in one frame. In a further embodiment, the configuration information is included within the media content 820 as various types of action-indicator other than a watermark. For example, the configuration information may be included as, e.g., a sound or a header field.

Still referring to FIG. 8, in an embodiment where the configuration information is included in the media content 820 as a watermark 880, the media player may search one or more frames of the media content 820 for the watermark 880, and may search one or more specified locations within the frames. For example, dashed boxes in FIG. 8 illustrate two designated search locations 870A and 870B where the media player searches for the watermark 880. Searching or scanning for the watermark 880 may be accomplished via various acceptable methods, which may include character recognition, barcode scanning, image mapping, and audio analysis. Furthermore, the media player may be configured to search these locations, or it may be configured to search in a default location (e.g., a location within the first frame of the media content 820) for an instruction that configures to the media player to search for the watermark 880 in a specified location, such as one of the locations 870A and 870B. The number and locations of search locations may be selected according to the application. For example, search locations may be in the four corners of a frame; top edges of a frame; side edges of a frame; center of a frame; or the entire frame.

In another embodiment, the search for the watermark 880 may be limited to a defined number of frames of the media content 820. For example, the search for the watermark 880 may occur only on the first frame of the media content 820, or may occur only on the first fifty frames of media content.

In an embodiment depicted in FIG. 8, the watermark 880 is "MovieStudio.com", and has been identified within the first designated search location 870A. There may be one or more instructions associated with the watermark 880 as determined by the media player. Furthermore, the watermark 880 may identify a portion of a Uniform Resource Locator (URL) or other Uniform Resource Identifier (URI) that the media player is to contact.

For example, an instruction associated with the watermark 880 may be: "contact the URI located at www.ABCD/mediaplayerUI/index.htm where ABCD is determined by the text of the located watermark [880]." In the present example, then, the instruction associated with the 'MovieStudio.com' watermark 880 would be to "contact www.MovieStudio.com/mediaplayerUI/index.htm".

In an embodiment, an instruction associated with watermark 880 may initiate various events as described herein, such as sending data to a remote server, obtaining data and/or media content, modifying a interface field 810 of the display-window 800, preventing playback of the media content 820, modifying the playback controls 850 of a display-window 800, and the like.

For example, as described herein, user data and media-use data may be sent to the content-provider server 200 to determine whether updates or changes should be made to one or more portions of the display-window 800, or if presenting the media content 820 is even allowed.

In an embodiment, the media player that generates the display-window 800 may scan one or more frames of the media content 820 before the media content is displayed in the display-window 800. Accordingly, the display-window 800 may be pre-customized or configured before the media content 820 is presented so that the viewer does not perceive a change taking place in the display-window 800 during playback of the media content 820.

Although four modifiable interface fields 810 are depicted in FIG. 8, the display window 800 may include fewer or more than four interface fields, and other elements of the display window may be modified. In a further example, advertising media may be selectively presented before playing the media content 820, during media content playback, or after media content playback, in the rendering field 860 or in one or more of the interface fields 810.

Figure 9:
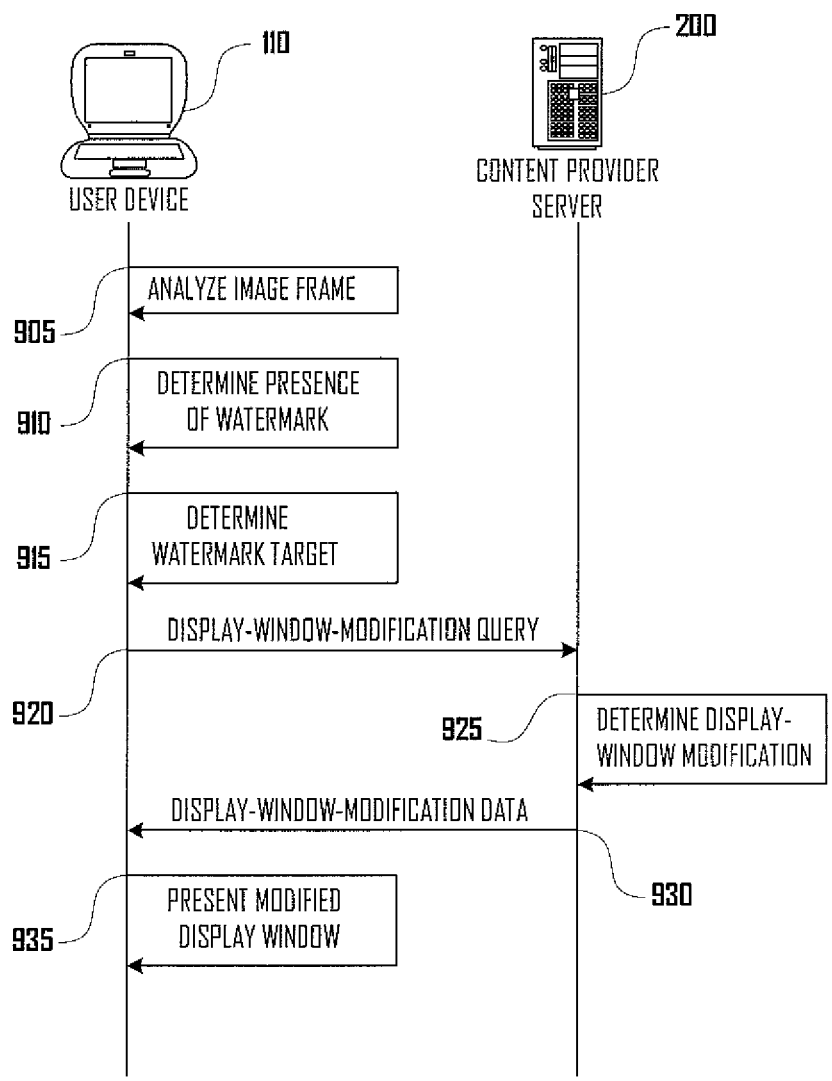
FIG. 9 is a data-flow diagram of and embodiment of communications between a user device and a content-provider server during watermark detection and display-window modification.

FIG. 9 is a data-flow diagram of communications between a user device 110 and a content-provider server 200 that may occur during an embodiment of a procedure for watermark detection and display-window modification.

For example purposes, assume that, Twentieth Century Fox® distributes via a website free downloads of Family Guy® episodes, and desires to also promote other Fox® programming and products while viewers watch the free episodes. Therefore, Fox® imbeds a watermark 880 in one or more of the initial frames of the free Family Guy® episodes, and the watermark directs a media player playing the free episode to obtain updated advertisements from a Fox® web server and present these advertisements in conjunction with the media player's presentation of the downloaded Family Guy® episode. Further assume that Fox® updates these advertisements to promote new shows and products as they are released.

Referring to FIGS. 8-9, the communications begin at 905 (FIG. 9) where the user device 110 analyzes an image frame of the media content 820 (FIG. 8), and at 910, the user device 110 detects the presence of a watermark 880 and determines that the watermark is a pointer that is pointing to the content-provider server 200 (FIG. 2), which in this example is owned by Fox®. However, in various embodiments, a DRM server 130, media content server 90, the user device 110, or other device may be identified as a watermark-target.

Because Fox's® content-provider server 200 has been identified as the watermark-target in this example, the user device 110 sends a display-window-modification query to the content-provider server at 920, and the server determines whether there exists a corresponding display-window modification at 925. If a corresponding interface modification exists, then at 930, the content-provider server 200 sends display-window-modification data to the user device 110 at 930, and the user device modifies the display window 800 accordingly at 935. For example, the user device 110 may modify the display window 800 such that an interface field 810 displays up-to-date advertisements of Fox® programming.

Figure 10:
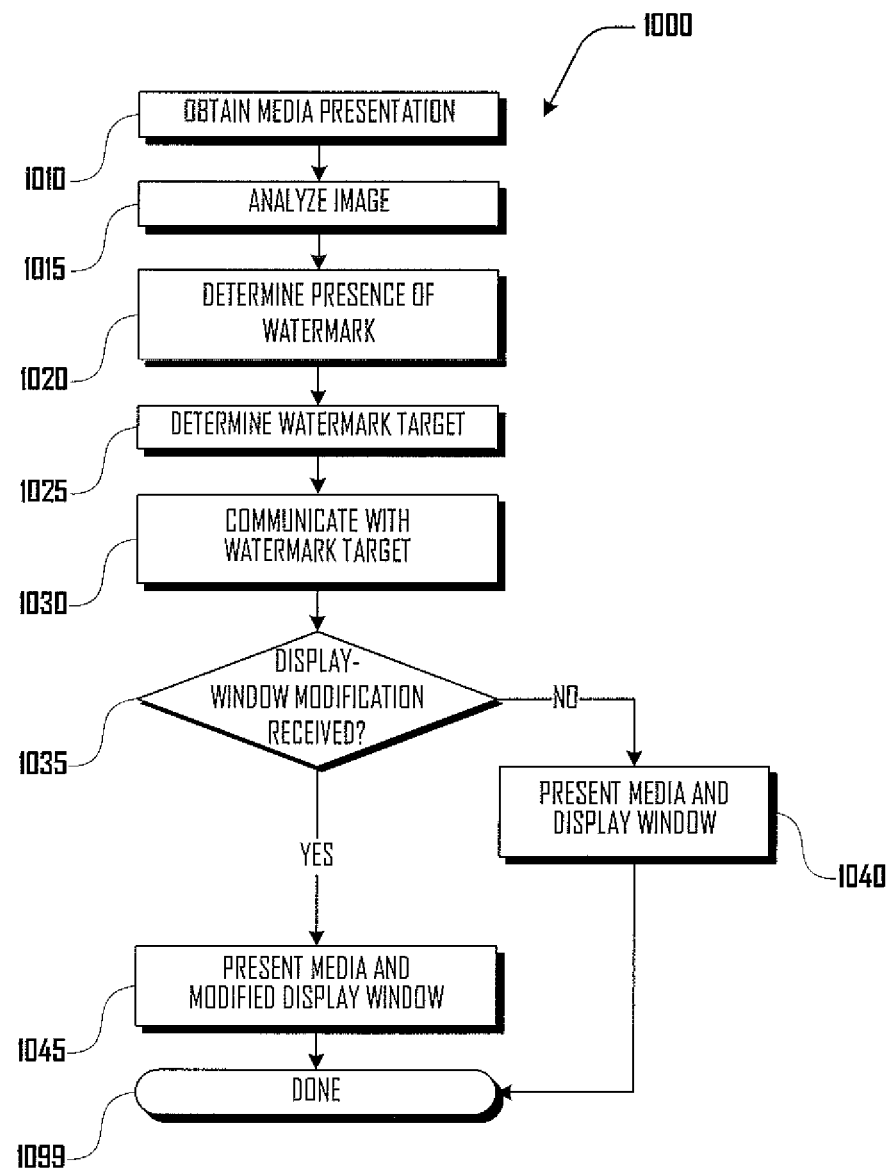
FIG. 10 is a flow chart of an embodiment of a method for watermark detection and display-window modification.

FIG. 10 is a flow chart of an embodiment of a watermark-detection-and-display-window-modification method 1000. The watermark-detection-and-display-window-modification method 1000 begins at block 1010, where the user device 110 obtains (e.g., downloads) media content 820, and continues to block 1015, where the user device analyzes one or more images of the media content 820.

The method 1000 continues to block 1020, where the user device 110 detects the presence of a watermark 880, and to block 1025, where the user device 110 determines a target to which the watermark points. At block 1030, the user device 110 initiates communication with the target.

At block 1035, the user device 110 determines whether it has received a display-window modification.

If the user device 110 determines that a display-window modification has not been received (e.g., the target server has no corresponding modification to send), then the method 1000 continues to block 1040, where media player running on the user device presents the media content 820 with an unmodified (e.g., default) display window 800. After the media player presents the media content 820, the method 1000 ends at block 1099.

If, however, the user device 110 determines that a display-window modification has been received (e.g., the target server has sent a corresponding modification), then at block 1045, the user device modifies the display window 800 accordingly, and the media player presents the media content 820 in the modified display window (advertisements presented with the media content within the rendering portion 860 or, e.g., as sounds, are considered to be display-window modifications). After the media player presents the media content 820 in the modified display window 800, the method 1000 ends at block 1099.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A method, comprising:
    recovering, using a processor, from a media presentation:
    a media-content portion; and
    a display-window-configuration component, wherein the media-content portion and display-window-configuration component are cryptographically bound with a cryptographic binding, wherein at least one of the cryptographically bound media-content portion and/or display-window-configuration component is encrypted;
    unbinding and/or verifying the cryptographic binding using the processor, wherein unbinding and/or verifying the cryptographic binding comprises decrypting the media-content portion and/or display-window-configuration component;
    responsive to the display-window-configuration component, generating a display window, wherein generating the display window comprises modifying a default display window configuration and presenting the modified display window on a display, wherein modifying the default display window comprises imparting a modified appearance to at least a portion of the display window other than a rendering field; and
    rendering the media content contemporaneous with presenting the display window, wherein the media content comprises visual content, wherein rendering the media content comprises rendering the media content within a rendering field of the display window, and wherein modifying the default display window comprises modifying a layout of the rendering field.

2. The method of claim 1, wherein imparting a modified appearance to at least a portion of the display window other than a rendering field comprises modifying a skin of the display window.

3. The method of claim 1, further comprising rendering advertisement content within another portion of the display window.

4. The method of claim 3, further comprising obtaining the advertising content from a remote source responsive to the display-window-configuration component.

5. The method of claim 1, wherein the cryptographic binding comprises a hash computed across some or all of the media-content portion and the display-window-configuration component and wherein unbinding and/or verifying the cryptographic binding further comprises verifying a local computation of the hash against a reference hash.

6. The method of claim 1, further comprising sending data to a remote device in response to the display-window-configuration component.

7. The method of claim 6, further comprising:
    receiving a media-content-presentation denial; and
    responsive to the media-content-presentation denial, preventing rendering of the media content.

8. The method of claim 1, further comprising sending a display-window-modification query to a remote location.

9. The method of claim 1, further comprising:
    obtaining display-window-modification data wherein modifying the default display window is based on the obtained display-window-modification data.

10. The method of claim 9, wherein the display-window-modification data comprises instructions to modify the default display window.

11. The method of claim 9, wherein the display-window-modification data comprises media and wherein the default display window is modified to present the media.

12. The method of claim 9, wherein the display-window-modification data comprises a uniform resource locator (URL) wherein the default display window is modified to include the URL and/or a rendered content portion which may be clicked on or otherwise activated by a user to obtain data from a data source associated with the URL.

13. A computer system for presenting a media presentation comprising:
    a display, and
    a processor operable to:
    recover from a media presentation:
    a media content portion; and
    a display-window-configuration component, wherein the media-content portion and display-window-configuration component are cryptographically bound, and wherein the cryptographically bound media-content portion and display-window-configuration component are encrypted in whole or in part and recovering the media-content portion and the display-window-configuration component comprises decrypting the media-content portion and display-window-configuration component; and
    responsive to the display-window-configuration component, generate a display window on the display and render the media content on the display, wherein generating the display window comprises modifying a default display window configuration by imparting a modified appearance to at least a portion of the display window other than a rendering field and presenting the modified display window, wherein the media content comprises visual content rendered within a rendering field of the display window, and wherein modifying the default display window comprises modifying a layout of the rendering field.

14. The computer system of claim 13, wherein the processor is further operable to initiate sending a display-window-modification query, responsive to the display-window-configuration component, to a remote location.

15. The computer system of claim 14, wherein the default display window is modified based on obtained display-window modification data.

16. The computer system of claim 15, wherein the display-window-modification data comprises instructions to modify the default display window.

17. The computer system of claim 15, wherein the display-window-modification data comprises media and wherein the default display window is modified to present the media.

18. The computer system of claim 15, wherein the display-window modification data comprises a uniform resource locator(URL) and wherein the default display window is modified to include the URL.

19. The computer system of claim 13, wherein the display-window configuration component is configured to be auto-run by the processor after being recovered.

20. The computer system of claim 13, wherein the display-window configuration component initiates obtaining display window updates and modifying the default display window in response to obtained display window updates.

21. The computer system of claim 13, wherein the display-window configuration component is configured to initiate preventing rendering of the media content if a media presentation denial is obtained.

22. The computer system of claim 13, wherein the media content comprises audio media content.

23. The computer system of claim 13, wherein the processor is further operable to modify rendering of the media content responsive to the display-window configuration component.

24. The computer system of claim 23, wherein modification of the rendering of the media content comprises adding additional video content to one of the beginning, middle, or end of a video.

25. The computer system of claim 13, wherein the cryptographically bound media-content portion and display-window-configuration component have had a reference hash computed across them and wherein recovering the media-content portion and the display-window-configuration component further comprises computing a hash of the display-window-configuration component and media-content portion and comparing the computed hash to the reference hash.

* * * * *